(12) United States Patent
Parra et al.

(10) Patent No.: US 10,200,905 B2
(45) Date of Patent: Feb. 5, 2019

(54) METHOD AND APPARATUS FOR MODIFICATION OF A REPORTING INTERVAL VIA A NETWORK

(71) Applicants: AT&T Mobility II LLC, Atlanta, GA (US); AT&T Intellectual Property I, L.P., Atlanta, GA (US)

(72) Inventors: Darwin Parra, Austin, TX (US); Rajendra Prasad Kodaypak, Sammamish, WA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 164 days.

(21) Appl. No.: 15/212,530

(22) Filed: Jul. 18, 2016

(65) Prior Publication Data
US 2018/0020369 A1    Jan. 18, 2018

(51) Int. Cl.
*H04W 24/10* (2009.01)
*H04W 4/70* (2018.01)

(52) U.S. Cl.
CPC ............. *H04W 24/10* (2013.01); *H04W 4/70* (2018.02)

(58) Field of Classification Search
CPC . H04W 4/005; H04W 68/02; H04W 52/0216; H04W 74/0833; H04W 72/042; H04W 74/006; H04W 76/048; H04W 24/08; H04W 24/10; H04W 60/02; H04W 8/02; H04W 8/12; H04W 8/18; H04W 24/02; H04W 4/00; H04W 4/08; H04W 52/0229; H04W 52/02
USPC ....................................................... 370/241
See application file for complete search history.

(56) References Cited

U.S. PATENT DOCUMENTS

| 8,588,803 | B2 | 11/2013 | Hakola et al. |
| 8,594,023 | B2 | 11/2013 | He et al. |
| 8,612,572 | B2 | 12/2013 | Hayes et al. |
| 8,750,145 | B2 | 6/2014 | Shaheen |

(Continued)

FOREIGN PATENT DOCUMENTS

| CA | 2829047 | 1/2013 |
| CN | 102118739 | 7/2011 |

(Continued)

OTHER PUBLICATIONS

Ghavimi, Fayezeh, and Hsiao-Hwa Chen. "M2M communications in 3GPP LTE/LTE-A networks: architectures, service requirements, challenges, and applications." IEEE Communications Surveys & Tutorials 17.2 (2015): 525-549. http://www.academia.edu/download/37911972/M2M_Communications_in_3GPP_LTE_and_LTE-A_Networks-Architecture_Service_Requirements_Challenges_ans_Applications.pdf.

(Continued)

*Primary Examiner* — Natasha W Cosme

(57) ABSTRACT

A method and apparatus for modification of a reporting interval are disclosed. For example, the method determines whether a modification of a reporting interval of a machine type communication device is to be performed, when the machine type communication device is a device of a customer for which the modification of the reporting interval is provided, identifies a reporting interval for the machine type communication device when the modification of the reporting interval of the machine type communication device is to be performed, and sends the reporting interval that is identified to the machine type communication device in a message.

20 Claims, 6 Drawing Sheets

(56) References Cited

U.S. PATENT DOCUMENTS

| | | | |
|---|---|---|---|
| 8,995,906 | B2 | 3/2015 | Lee et al. |
| 9,014,062 | B2 | 4/2015 | Ahn et al. |
| 9,031,013 | B2 | 5/2015 | Tao et al. |
| 9,055,163 | B1 | 6/2015 | Row, II et al. |
| 9,191,828 | B2 | 11/2015 | Li et al. |
| 9,241,340 | B2 | 1/2016 | Yie et al. |
| 9,386,566 | B2 | 7/2016 | Turtinen et al. |
| 2010/0057485 | A1 | 3/2010 | Luft |
| 2012/0106517 | A1 | 5/2012 | Charbit et al. |
| 2012/0282956 | A1* | 11/2012 | Kim .................. H04L 51/38 455/466 |
| 2013/0304264 | A1 | 11/2013 | Shao |
| 2013/0322413 | A1 | 12/2013 | Pelletier et al. |
| 2014/0073367 | A1 | 3/2014 | Chou |
| 2014/0247795 | A1 | 9/2014 | Kim et al. |
| 2014/0258474 | A1 | 9/2014 | Kim |
| 2014/0286279 | A1 | 9/2014 | Choi et al. |
| 2015/0045050 | A1 | 2/2015 | Sartori et al. |
| 2015/0163831 | A1 | 6/2015 | Wang et al. |
| 2015/0280801 | A1 | 10/2015 | Xin et al. |
| 2015/0305054 | A1 | 10/2015 | Elfstrom et al. |
| 2015/0373528 | A1* | 12/2015 | Iwai .................. H04W 24/02 455/419 |
| 2016/0050698 | A1 | 2/2016 | Siomina |

FOREIGN PATENT DOCUMENTS

| | | |
|---|---|---|
| CN | 102143205 | 8/2011 |
| EP | 2878157 | 10/2014 |
| WO | WO 2016/074714 | 5/2016 |

OTHER PUBLICATIONS

Butt, Talal Ashraf, et al. "Adaptive and context-aware service discovery for the internet of things." Internet of Things, Smart Spaces, and Next Generation Networking. Springer Berlin Heidelberg, 2013. 36-47. https://dspace.lboro.ac.uk/dspace-jspui/bitstream/2134/13491/3/Adaptive%20and%20Context-aware%20Service%20Discovery%20for%20the%20Internet%20of%20Things.pdf.

Butt, Talal Ashraf, et al. "TRENDY: An Adaptive and Context-Aware Service Discovery Protocol for 6LoWPANs." (2012). http://webofthings.org/wot/2012/papers/Pervasive_WoT2012_Paper4.pdf.

Borodakiy, Vladimir Y., et al. "Modelling and analysing a dynamic resource allocation scheme for M2M traffic in LTE networks." Internet of Things, Smart Spaces, and Next Generation Networking. Springer Berlin Heidelberg, 2013. 420-426. https://www.researchgate.net/profile/Irina_Gudkova/publication/285055131_Modelling_and_Analysing_a_Dynamic_Resource_Allocation_Scheme_for_M2M_Traffic_in_LTE_Networks/links/565b2cc308aefe619b242c33.pdf Disclosing dynamic M2M resource allocation/packer scheduling communications (p. 422, Mathematical Model).

Gama, Kiev, Lionel Touseau, and Didier Donsez. "Combining heterogeneous service technologies for building an Internet of Things middleware." Computer Communications 35.4 (2012): 405-417. https://pdfs.semanticscholar.org/2aeb/fe683a93f40f864da023f1cb1113c469ac76.pdf.

\* cited by examiner

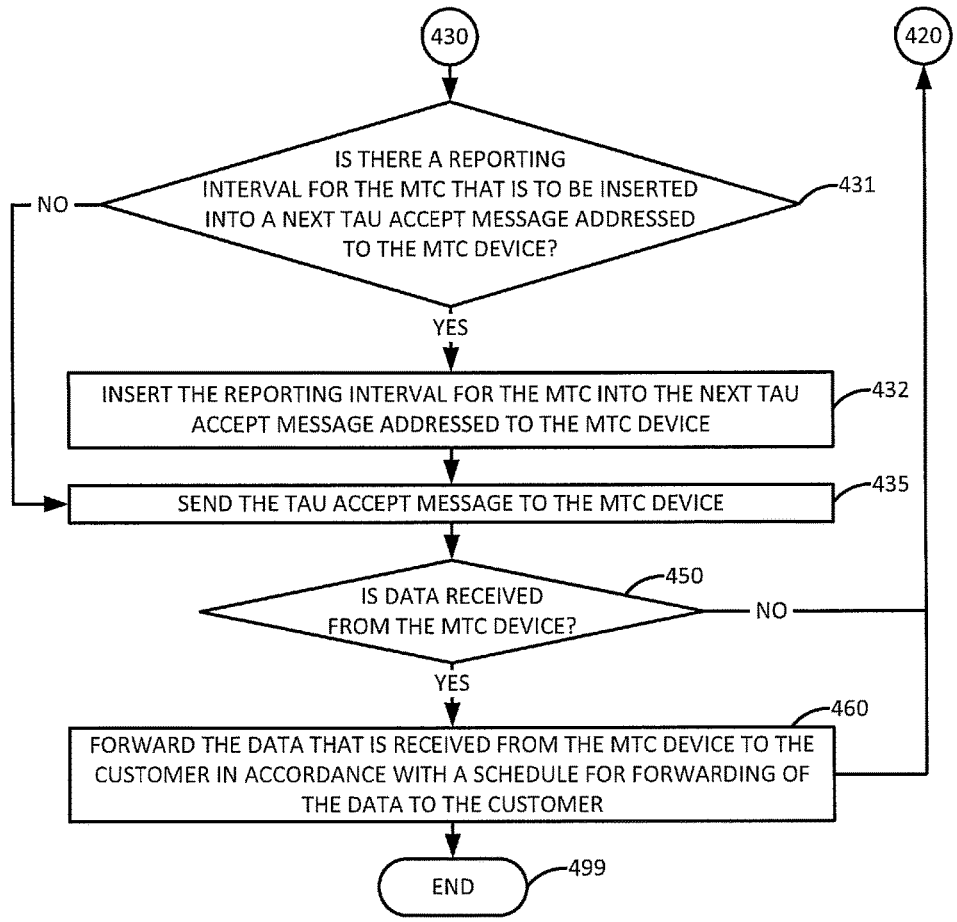
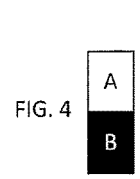
FIG. 4B
FIG. 4

METHOD AND APPARATUS FOR MODIFICATION OF A REPORTING INTERVAL VIA A NETWORK

The present disclosure relates to a method and apparatus for modification of a reporting interval via a communications network, e.g., a wireless communications network of a network service provider.

BACKGROUND

As Internet of Things (IoT) devices become ubiquitous, a network service provider, e.g., a communications network service provider, may provide connectivity among a large number of IoT devices and servers. The IoT devices consume power when they are actively transmitting or receiving data and/or performing tracking area updates.

SUMMARY OF THE DISCLOSURE

In one embodiment, the present disclosure teaches a method and apparatus for modification of a reporting interval via a communications network. For example, the method determines whether a modification of a reporting interval of a machine type communication device is to be performed, when the machine type communication device is a device of a customer for which the modification of the reporting interval is provided, identifies a reporting interval for the machine type communication device when the modification of the reporting interval of the machine type communication device is to be performed, and sends the reporting interval that is identified to the machine type communication device in a message.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a method and apparatus for modification of a reporting interval via a communications network, e.g., a communications network of a network service provider. The teachings of the present disclosure may be applied for any type of wireless communications network, e.g., a Long Term Evolution (LTE) network, a 5G network, etc.

Figure 1:
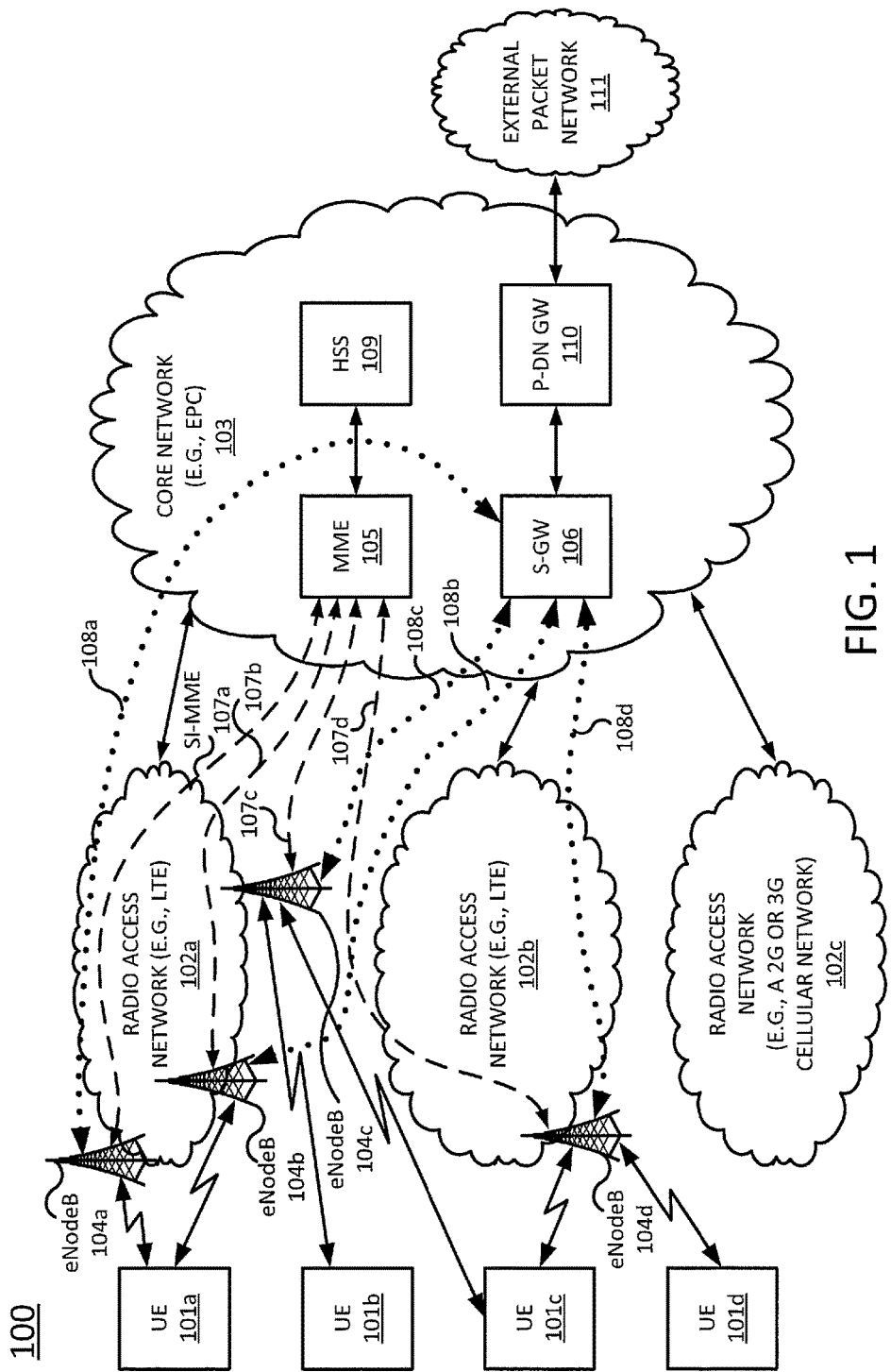
FIG. 1 illustrates an example network related to the present disclosure.

FIG. 1 illustrates an example network 100 related to the present disclosure. In one illustrative embodiment, the network 100 may comprise User Endpoint (UE) devices 101a-101d, radio access networks 102a-102c, and a core network 103.

The UE devices 101a-101d may comprise any appropriate type of user equipment, e.g., a mobile phone, a computing tablet, a smart phone, and any type of sensors, e.g., a meter reader, a motion sensor, a temperature sensor, a chemical sensor, a moisture sensor, a camera, a presence sensor, a navigational sensor, an optical sensor, a contact sensor, a proximity sensor and the like. A UE device may be a device that communicates via machine-to-machine (M2M) communications interface or may be a device to be used via a human-machine interface. For example, the UE device may be a smart phone to be used by a human for communication (e.g., voice call or text messaging) or a meter that collects data via sensors and reports to a server via an M2M interface. It is to be understood that the UE devices depicted in FIG. 1 are only examples and not intended to be limiting.

The radio access networks 102a-102c may comprise cellular or other wireless technologies, e.g., Wi-Fi networks, LTE networks, 5G networks, and the like. The core network 103 may comprise any type of communications networks, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

In one embodiment, the core network 103 comprises an Evolved Packet Core (EPC). In one embodiment, the radio access networks 102a and 102b comprise LTE networks and the radio access network 102c comprises another wireless network, e.g., a 2G or 3G cellular network.

In one embodiment, the core network 103 comprises a Mobility Management Entity (MME) 105, a Serving Gateway (S-GW) 106, a Home Subscriber Server (HSS) 109, and a Packet Data Network (PDN) Gateway (PDN-GW) 110. In one embodiment, the LTE network 102a comprises eNodeBs 104a-104c and the LTE network 102b comprises eNodeB 104d. The eNodeBs 104a-104d are used for providing wireless connectivity to UE devices 101a-101d. The eNodeBs 104a-104d are communicatively coupled with MME 105 via S1-MME interfaces 107a-107d, respectively. Similarly, the eNodeBs 104a-104d are communicatively coupled with S-GW 106 via S1-U interfaces 108a-108d, respectively. The S1-MME interfaces 107a-107d are used for control plane and the S1-U interfaces 108a-108d are used for user plane.

The MME 105 is responsible for control plane functionalities, e.g., paging, roaming, handover, tracking, allocation of resources, etc. For example, the MME 105 may be responsible for authenticating the UE through the HSS, e.g., HSS 109, for paging a UE, e.g., a UE 101a, 101b, 101c or 101d, for bearer activation and deactivation, for choosing an S-GW, e.g., the S-GW 106, during an initial attachment, for choosing an S-GW during an intra-LTE handover that involves the core network 103, for mobility between an LTE and another radio access network, e.g., a 2G/3G cellular network 102c, and the like.

The S-GW 106 serves as the mobility anchor for the user plane and is responsible for routing user data packets. In addition, the S-GW 106 terminates downlink data paths and triggers paging when downlink data arrives while the UE is in idle state. For example, the S-GW 106 may be tasked with maintaining a data path between a PDN-GW, e.g., PDN-GW 110, and an eNodeB 104a, 104b, 104c or 104d, that is serving a UE 101a, 101b, 101c or 101d.

The HSS 109 is a server that provides subscription and user related data. HSS 109 also provides user authentication and authorization. The PDN-GW 110 is responsible for providing connectivity to external packet data networks, e.g., external packet network 111.

In operation, a UE device may access any number of services via bearers that are established to connect the UE device to multiple packet data networks (PDNs), e.g., the Internet, a corporate Intranet network, etc. For example, when the UE is turned on and is successfully authenticated, a first bearer may be established between the UE and a default PDN gateway (P-GW), e.g., PDN-GW 110. Subsequently, other bearers may be activated between the UE and the same or other PDN-GWs based on the number of services and/or the types of services that the UE is entitled to access.

In addition, the UE may be located at an area served by many eNodeBs. As such, the core network may allocate any number of tracking areas to the UE. The term "Tracking Area" refers to a logical area within which the UE may change the physical location of the UE without providing an update of a tracking area to the MME. For example, each eNodeB may broadcast a tracking area code (TAC) that identifies a tracking area to which the eNodeB belongs. The UE may maintain a tracking area list that contains a list of TACs that are valid for the UE. When the UE relocates to a new cell that is already on the list of TACs that are valid for the UE, a tracking area update procedure may not be invoked. However, when the UE relocated to a new cell that is not already on the list of TACs that are valid for the UE, an update to the tracking area is performed.

In order to clearly illustrate the teachings of the present disclosure, the following terminology will first be described:
  Internet of Things;
  Sensor; and
  Machine Type Communication (MTC) device.

In one embodiment, Internet of Things (IoTs) refer to devices that have the ability to send and/or receive data without requiring a human-to-human or a human-to-computer interaction. IoTs include necessary electronics, software, and network connectivity to collect and exchange data. For example, the IoTs may have Internet Protocol (IP) addresses for Internet connectivity.

A sensor refers to a device that detects or measures an event or a change, and provides an output that indicates the event or the change that is detected. There are a great number of different types of sensors. For example, the sensor may be for sensing biometric information, e.g., a body temperature, a heart rate, a blood pressure, etc. or for sensing environmental information, e.g., temperature, humidity, wind condition, etc. A sensor may be implemented as an IoT device. For example, the sensor may have an IP address. The sensor may then detect or measure an event and transmit data associated with the detected or measured event via the Internet.

Machine Type Communication (MTC) device refers to a UE device that collects and disseminates data to enable a machine to operate in an automated manner. An MTC device may use any type of wired or wireless communication technology. For example, when the MTC device is using an LTE technology, the MTC device may collect data and transmit the data to a server via an eNodeB of an LTE network. In addition, when the MTC device has an IP address for internet connectivity, the MTC device may be an IoT device. For the example of FIG. 1, a UE 101a, 101b, 101c or 101d may comprise an MTC device.

When a UE is an MTC device, the collection and dissemination of data occur without any interaction with a human. The data that is collected may also be referred to as sensed information. For example, suppose an MTC device is implemented to monitor a water level via a sensor and to relay data to a server without any input from a human. Suppose, the server is for performing an automated function based on the data received from the MTC device. For example, suppose the server is implemented for automatically generating an alert when a water level reaches a predetermined threshold that is associated with a flooding condition. Then, the alert may be generated by the server when the server receives data (i.e., sensed information) from the MTC device indicating that the water level has reached or exceeded the predetermined threshold that is associated with the flooding condition.

MTC devices are used in various deployment scenarios. The deployment scenario, i.e., the application for which the MTC device is utilized, dictates the ease with which maintenance of the MTC device is performed. For example, the MTC device may be placed at a location at which frequent maintenance is either too costly or impossible to deliver. In another example, the MTC device may be located at a place where the safety of maintenance workers is a concern. In yet another example, the MTC device may be located in a secured area, e.g., in an area requiring security clearance. In yet another example, the MTC device may be located in an area that requires shutting down operations, e.g., near electrical wires, train tracks, and the like. As such, prolonging a battery life of an MTC device is advantageous.

One approach for prolonging a battery life of an MTC device is to use an MTC device with a Power Saving Mode (PSM). The PSM mode is a mode in which the MTC device is asleep. The duration of time in which the MTC device is in the PSM mode may be referred to as a PSM timer. During the PSM timer, the MTC device cannot be reached by the network of the service provider. However, the MTC device remains registered. When the MTC device exits the PSM mode, procedures for re-attachment and/or re-establishing of PDN connections are not needed. For example, when the PSM timer expires, the MTC device may wake up, perform a tracking area update, and transmit and/or receive data. The duration of time between consecutive PSM timers may be referred to as an active timer. The MTC device remains awake during the active timer. Thus, the MTC device is reachable during the active timer.

In operation, the MTC device may request a PSM timer and the network service provider allocates the PSM timer that is requested by the MTC device. Thus, the MTC device that implements a PSM timer is in control of managing the power usage by the MTC device. In this example, the MTC device generally manages the power usage based on local knowledge, i.e., based on information that is locally accessible by the MTC device. However, the customer and/or the network service provider may have other sources of information. For instance, there may be information from a weather service that provides a forecast that includes expected flood levels and/or durations. Unfortunately, the local knowledge of the MTC device may not take into account information gathered from the other sources. For example, the MTC device may select the PSM timer based solely on conditions that have occurred (i.e., sensed information and not forecasted). Additionally, the independent nature of the selection of the PSM timer locally by the MTC device, leads to each MTC device choosing its own respective PSM timer without having a network wide knowledge. In this example approach the MTC device controls the power usage, as opposed to allowing the network service provider to control the power usage. For example, the power usage of one MTC device is not coordinated with power usages by other devices, MTC or otherwise. Thus, although this approach does provide power usage management, it may not be efficient under certain scenarios.

In one embodiment, in contrast the present disclosure provides a method for modification of a reporting interval of an MTC device via a network service provider. The MTC device of the present disclosure receives the reporting interval from a network controller, e.g., an MME. For example, the MME of the network service provider may instruct the MTC device of a new reporting interval when the MTC device is awake and is performing a Tracking Area Update (TAU).

The reporting interval of the present disclosure enables the power usage by the MTC device to be controlled via the network service provider. Controlling the power usage via the network service provider may enable coordination of reporting intervals across a plurality of MTC devices. Moreover, the reporting interval may be modified in accordance with the need of the customer. For example, extending the reporting interval (e.g., to use a long PSM timer) to conserve power usage may be more beneficial for a scenario that is expected to last a long period of time, e.g., a hurricane lasting days or a flood lasting over several weeks. In contrast, reducing the reporting interval (e.g., to use a short PSM timer) may be more beneficial for a scenario that is expected to change over a short time interval. For example, for a flash flood scenario that changes over a few minutes, reducing the reporting interval, e.g., to five minutes, may be beneficial to receive important data relating to the flash flood.

In one embodiment, the network service provider provides a service to a customer for managing a reporting interval of an MTC device of the customer. The customer may then subscribe to the service provided by the network service provider. For an illustrative example, suppose the customer is a monitoring authority that is responsible for monitoring any number of MTC devices that are used to detect a flashflood for an area, e.g., a city, and to issue an alert to a community. The customer (i.e., the authority responsible for the monitoring) may then deploy the MTC devices at locations that may be prone to flashfloods, e.g., low altitude areas near rivers or creeks, canyon areas near deserts, low altitude coastal areas, etc. There may be any number of MTC devices scattered throughout the area(s) for which the authority is responsible. The authority may then subscribe to the service from the network service provider. The service is for having the capability for modification of a reporting interval of at least one of the MTC devices of the authority. In turn, the network service provider may perform the modification of the reporting interval based on the need of the authority, i.e., the customer.

In one embodiment, the need of the customer is assessed based on an agreement between the customer and the network service provider. For the example above, the network service provider and the customer may have an agreement to modify the reporting interval to a predetermined interval, e.g., a PSM timer of duration $t_{short}$, during a season known as having frequent flashfloods, when a weather forecast for the area indicates a chance of having a flashflood being above a predetermined percentage, and so on. Similarly, for other times, the agreement may be to modify the reporting interval to another predetermined interval, e.g., a PSM timer of duration $t_{long}$. For the illustrative example, $t_{short} < t_{long}$. The use of the terms "short" and "long" is only illustrative and these terms do not limit the present disclosure.

In one embodiment, the network service provider receives a request for a modification of the reporting interval of the MTC device from the customer. In one embodiment, the request for modification of the reporting interval may comprise a new reporting interval. For instance, the request for the modification of the reporting interval may include the actual reporting interval that is desired.

In one embodiment, the reporting interval may be a reporting interval that is selected from a set of reporting intervals, with each element of the set of reporting intervals being a reporting interval that is allowed. For example, each element of the set of reporting intervals may be a reporting interval that is determined as being appropriate for an application for which the MTC device is used. The customer may then select the reporting interval from among the set of reporting intervals that are allowed. In one embodiment, the network service provider determines the set of reporting intervals that are allowed.

In one embodiment, the customer may be communicating with the network service provider on a trusted domain. Then, the network service provider may expose the PSM timer to the customer via an Application Programming Interface (API). When the PSM timer is exposed to the customer via the API, the customer may issue the request for modification of the reporting interval of the MTC device via the API, i.e., via a channel in the trusted domain.

In one embodiment, the API may be implemented in a Service Capability Exposure Function (SCEF) of the network service provider. The SCEF may receive the request for modification of the reporting interval, buffer when necessary, and forward the request for modification of the reporting interval to the MME. The SCEF may also be used for buffering data that is to be delivered to the customer. For example, SCEF may buffer data, e.g., sensed information, for forwarding to a server of the customer.

In one example, the MME 105 receives and processes the request for the modification of the reporting interval from the SCEF, and instructs the MTC device of the reporting interval (i.e., the newest reporting interval) on the next TAU. For example, when the MTC device wakes up, the MTC device sends a TAU request to the MME. The MME may then provide the reporting interval to the MTC device in a TAU accept message. The MTC device may then begin providing data (i.e., sensed information) in accordance with the reporting interval, i.e., the newest reporting interval, received from the MME. The MME forwards the data to the customer via the SCEF.

Figure 2:
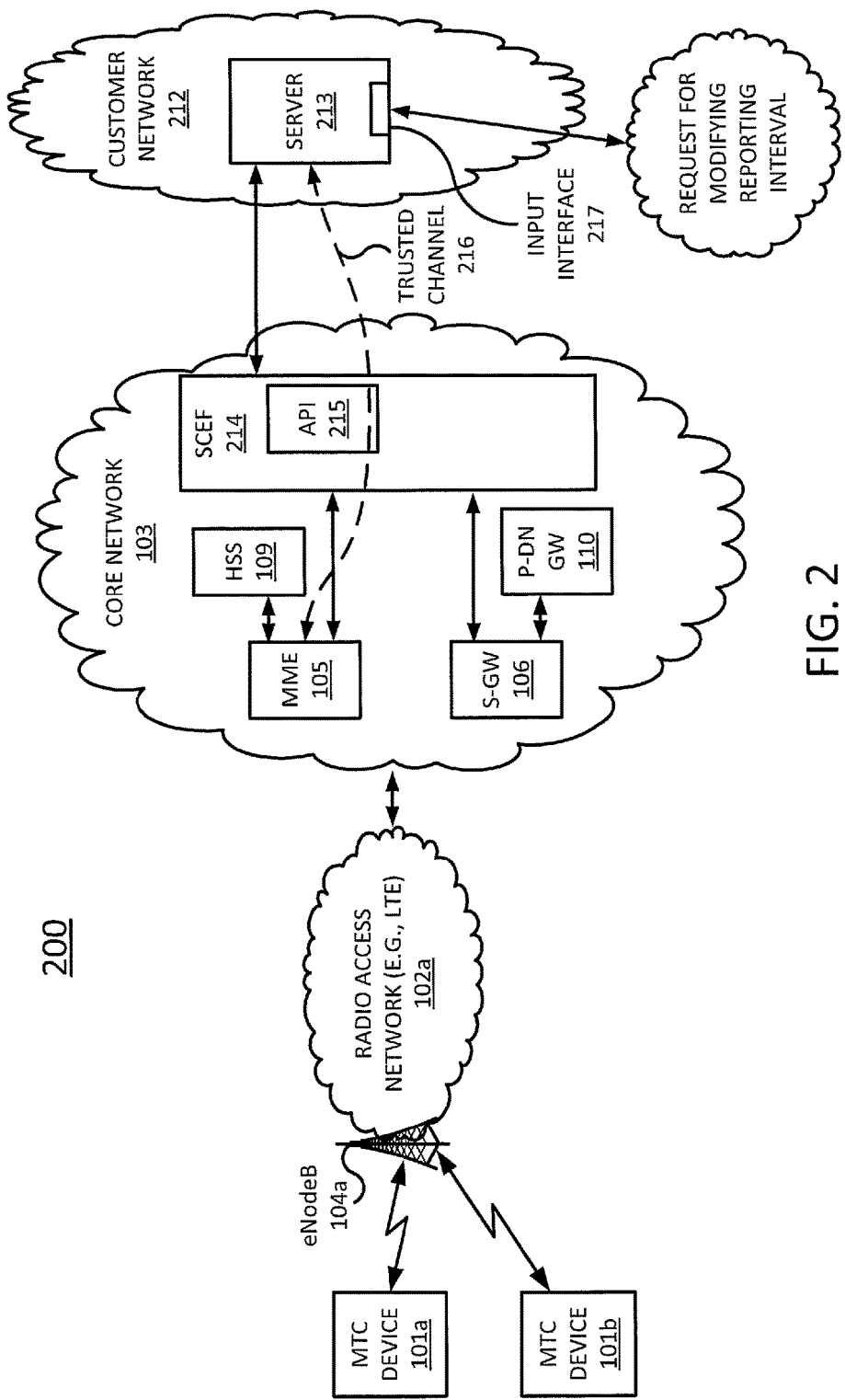
FIG. 2 illustrates an example network related to the present disclosure for modification of a reporting interval.

FIG. 2 illustrates an example network 200 related to the present disclosure for modification of a reporting interval. In one illustrative embodiment, the network 200 may comprise MTC devices 101*a*-101*b*, an LTE 102*a*, a core network 103, and a customer network 212.

In one embodiment, the LTE radio access network 102*a* comprises eNodeB 104*a*. The eNodeB 104*a* is used for providing wireless connectivity to MTC devices 101*a*-101*b*.

The customer network 212 may comprise an application server 213 of the customer. In one embodiment, the application server 213 may be used for monitoring MTC devices 101*a*-101*b* and receiving requests for modification of reporting intervals, e.g., via input interface 217. The input interface 217 may be to receive inputs from another application server, a user endpoint device, or any other devices.

The core network 103 comprises an MME 105, an S-GW 106, an HSS 109, a PDN-GW 110, and a Service Capability Exposure Function (SCEF) 214. The application server 213 of the customer may be communicatively coupled to SCEF 214. In one embodiment, the communication between the SCEF 214 and the application server 213 occurs via a trusted channel. The API 215 may be used for enabling the customer to provide the reporting interval, e.g., a selected reporting interval, via a trusted channel 216. In one embodiment, when the communication between the SCEF 214 and the application server 213 occurs via the trusted channel, a request for modification of a reporting interval of an MTC device 101a or 101b may be provided to the MME 105 via the trusted channel 216.

It should be noted that the network 200 may include additional networks and/or elements that are not shown to simplify FIG. 2. For example, the LTE network and the core network of FIG. 2 may include additional network elements (not shown), such as for example, base stations, border elements, gateways, firewalls, routers, switches, call control elements, various application servers, and the like. In addition, various types of data may be stored in any number of databases. For instance, various databases, e.g., a database for user endpoint devices, a database for MTC devices, a database for a set of allowed reporting intervals, a database for queuing reporting intervals to be sent to MTC devices, etc., may be provided. In addition, the various types of data may also be stored in a cloud storage. In other words, the network service provider may implement the service for modification of a reporting interval of the present disclosure by storing data in a cloud storage and/or a centralized server.

In one embodiment, the MME 105 is used for implementing the present method for modification of the reporting interval. The MME 105 of the present disclosure is for determining whether a modification of a reporting interval of a machine type communication device is to be performed, when the machine type communication device is a device of a customer and is a device for which modification of the reporting interval is provided, for identifying a reporting interval for the machine type communication device when the modification of the reporting interval of the machine type communication device is to be performed, and for sending the reporting interval that is identified to the machine type communication device in a message. In one embodiment, the MME 105 is also for receiving a request for modification of the reporting interval from an application server of a customer, e.g., application server 213.

Figure 3:
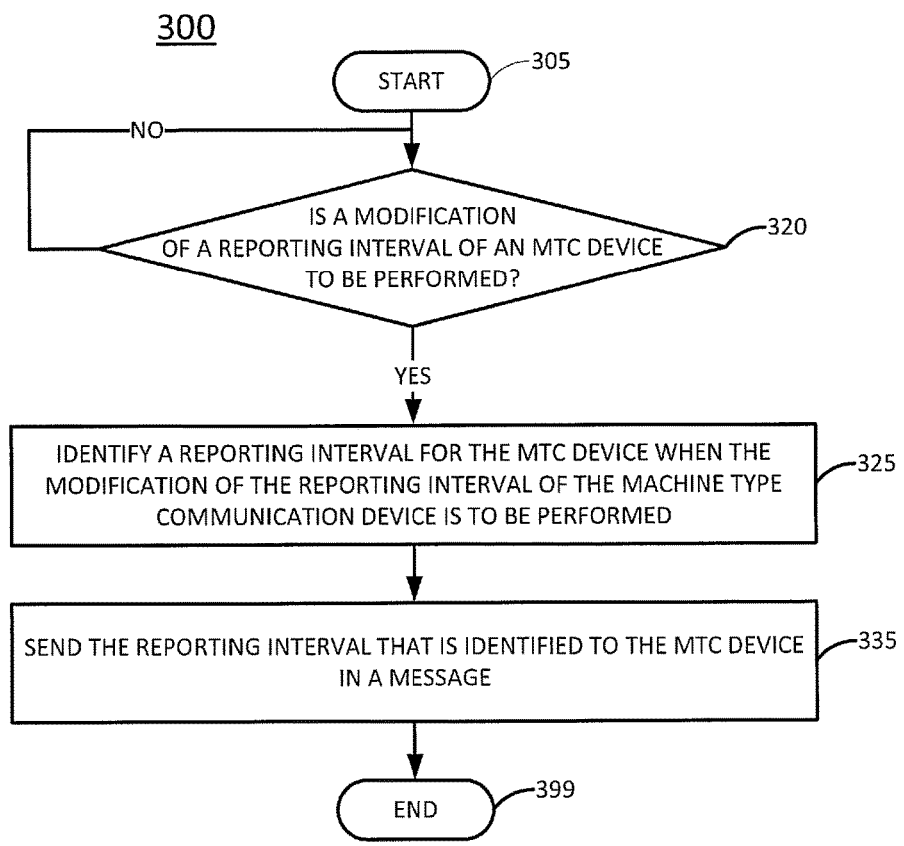
FIG. 3 illustrates a flowchart of an example method for modification of a reporting interval.

FIG. 3 illustrates a flowchart of an example method 300 for modification of a reporting interval in accordance with the present disclosure. In one embodiment, the method 300 may be implemented in an MME, e.g., an MME 105, or the processor 502 as described in FIG. 5.

The method 300 may be implemented for any number of MTC devices. For example, the MME 105 may be used for any number of MTC devices of any number of customers. For clarity, the flowchart of the example method 300 is described herein for an MTC device. The method 300 starts in step 305 and proceeds to step 320.

In step 320, the processor determines whether a modification of a reporting interval of an MTC device is to be performed. The determination of whether the modification is to be performed is made for the MTC device when the MTC device is an MTC device of a customer for which the modification of the reporting interval is provided by the network service provider. When the modification of the reporting interval of the machine type communication device is to be performed, the processor proceeds to step 325. Otherwise, the processor remains in step 320 to continue monitoring. For example, the monitoring may be for determining whether the modification of the reporting interval is to be performed.

In one embodiment, whether the modification of the reporting interval of the MTC device is to be performed is determined based on an assessment of a need of the customer. In one embodiment, whether the modification of the reporting interval of the MTC device is to be performed is determined based on whether a request for modification of the reporting interval of the MTC device is received from the customer.

In step 325, the processor identifies a reporting interval for the MTC device when the modification of the reporting interval of the machine type communication device is to be performed. In one embodiment, the reporting interval that is identified comprises a newest reporting interval. In one embodiment, the reporting interval that is identified is selected by the customer from a set of reporting intervals that is allowed. In one embodiment, the set of reporting intervals that is allowed is determined by the network service provider. In one embodiment, the identifying of the reporting interval is based on an agreement between the customer and the network service provider. In one embodiment, the identifying of the reporting interval is performed based on an assessment of a need of the customer. For example, the network service provider may identify or compute the reporting interval based on the assessment of the need of the customer. For instance, suppose the MTC device is for flood monitoring and a weather forecast indicates severe flooding condition for a region. Suppose also a current value of the reporting interval of the MTC device is eight hours. The assessment of the need of the customer may indicate that the MTC device should report the sensed information every hour instead. Once the reporting interval for the MTC device is identified, the processor may proceed to step 335.

In step 335, the processor sends the reporting interval that is identified to the MTC device in a message. The processor then proceeds either to step 320, or to step 399 to end the process.

In one embodiment, the message in which the reporting interval is sent comprises a TAU accept message. For example, when the MTC device is a device attached to an LTE network, the MTC device may send TAU request messages periodically. Then, the message in which the reporting interval is sent may be a response to a TAU request message that is received from the MTC device. For example, the message may be a TAU accept message that is sent as a response to a TAU request message.

In one embodiment, the TAU accept message in which the reporting interval is sent may be a TAU accept message that is generated as a response to a TAU request that is received prior to the reporting interval being identified. In one embodiment, the TAU accept message in which the reporting interval is sent may be a TAU accept message that is generated as a response to a TAU request that is received after the reporting interval is identified. When the TAU request is received after the reporting interval is identified, the processor may queue the reporting interval for sending in a next TAU accept message addressed to the MTC device.

It is important to note that the MTC device may be attached via another type of network. Thus, the reporting interval may be inserted into a type of message that is appropriate for the network to which the MTC device is attached. In other words, for the LTE network, the reporting interval may be inserted into the TAU accept message.

Equivalently, for other networks, the reporting interval may be inserted into a message that is sent to the MTC device for other purposes, e.g., for an attachment procedure, authentication procedure, etc.

Figure 4A:
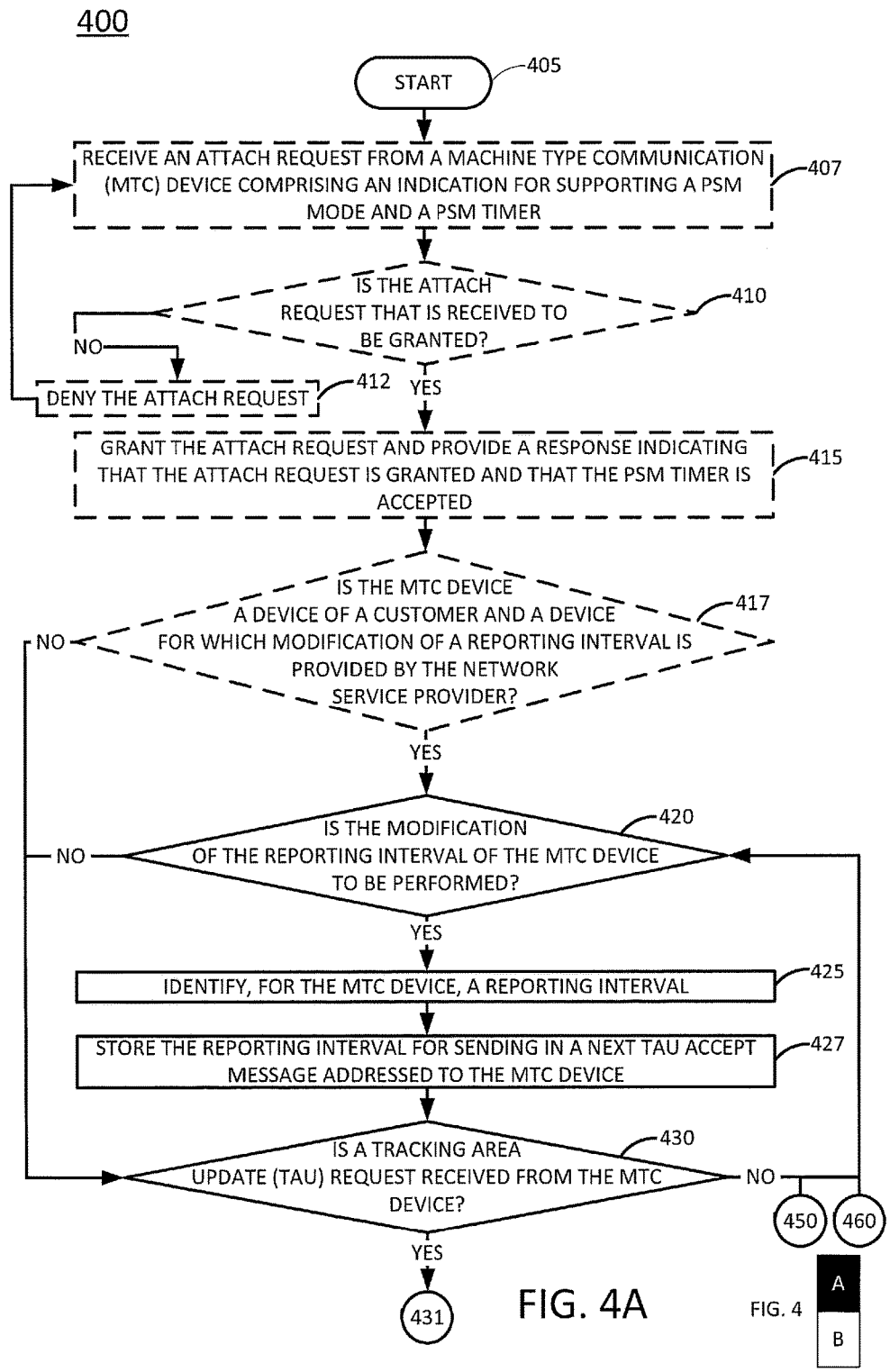
FIG. 4 (FIG. 4A and FIG. 4B) illustrates a detailed flowchart of an example method for modification of a reporting interval.

FIG. 4 (shown as FIG. 4A and FIG. 4B) illustrates a detailed flowchart of an example method 400 for modification of a reporting interval in accordance with the present disclosure. FIG. 4 includes the steps of the flowchart described in FIG. 3. However, FIG. 4 further illustrates additional steps that are for attachment of the MTC device to a network, e.g., an LTE network, for queuing reporting intervals until the reporting intervals are transmitted to the MTC device, for receiving and forwarding data to the MTC device, and the like. In one embodiment, the method 400 may be implemented in an MME, e.g., an MME 105, or the processor 502 as described in FIG. 5. The method 400 starts in step 405 and proceeds to step 407.

In optional step 407, the processor, receives an attach request from an MTC device. The attach request that is received comprises an indication for supporting a Power Saving Mode (PSM) and a PSM timer.

In optional step 410, the processor, determines whether the attach request that is received is to be granted. For example, the attach request may be processed to determine whether the attach request should be granted. When the attach request is to be granted, the processor proceeds to step 415. Otherwise, the processor proceeds to step 412.

In optional step 412, the processor denies the attach request. For example, the attach request may be denied when an authentication information request sent to an HSS by the MME is not successful. The processor then proceeds to step 407.

In optional step 415, the processor grants the attach request and provides a response indicating that the attach request is granted and that the PSM timer is accepted. The processor then proceeds to step 417.

The accepting of the PSM timer indicates to the MTC device that the MTC device may enter the PSM mode upon an expiration of an active timer of the MTC device. For example, the MTC device may stay active for the duration of the active timer to transmit and/or receive data. When the active timer of the MTC device expires, the MTC device may then enter the PSM mode.

In optional step 417, the processor determines whether the MTC device is a device of a customer for which the modification of a reporting interval is provided by the network service provider. For example, the customer may subscribe to a service from the network service provider. For instance, the service may be for modification of the reporting interval of the MTC device of the customer. When the MTC device is a device of the customer and the modification of the reporting interval is provided by the network service provider, the processor proceeds to step 420. Otherwise, the processor proceeds to step 430.

In step 420, the processor determines whether the modification of the reporting interval of the MTC device is to be performed. For example, the processor may monitor to determine whether a condition for performing the modification of the reporting interval of the MTC device is met. For instance, the condition for the modification of the reporting interval of the MTC device may be met when a request for the modification is received from the customer associated with the MTC device. When the processor determines that the modification of the reporting interval of the MTC device is to be performed, the processor proceeds to step 425. Otherwise, the processor proceeds to step 430.

In step 425, the processor identifies a reporting interval for the MTC device. For example, the processor may identify a reporting interval for a request received from the customer associated with the MTC device. Once the reporting interval is identified, the processor proceeds to step 427.

In step 427, the processor stores (i.e., queues) the reporting interval of the MTC device. The reporting interval is stored for sending in a next TAU accept message that is addressed to the MTC device. The processor then proceeds to step 430.

When the next TAU request message is received from the MTC device, the MME may include the newest reporting interval in the TAU accept message to be sent to the MTC device in response to the next TAU request message that is received from the MTC device.

In one embodiment, the queuing of the reporting interval comprises storing the newest reporting interval for the MTC device. For example, for the MTC device, the MME may store the newest reporting interval that is obtained. When the TAU request is received, the MME may insert the newest reporting interval in the TAU accept message. In one embodiment, the newest reporting interval is inserted in the TAU accept message only when the newest reporting interval is different from the last reporting interval that was sent to the MTC device.

In some scenarios, the storing (i.e., queuing) of the reporting interval may be for replacing another reporting interval. In other words, multiple requests for modification of the reporting interval may be received from the customer before the MTC device exits the PSM mode. For example, a customer may select a reporting interval of one hour. After some time prior to the MTC device exiting the PSM mode, a condition that is being monitored may get worse and the customer may select another reporting interval, e.g., a reporting interval of ten minutes. Thus, the storing of the reporting interval of ten minutes may be for replacing the reporting interval of one hour in a queue. In another example, the customer may select a reporting interval of two hours. After some time prior to the MTC device exiting the PSM mode, a condition that is being monitored may improve and the customer may select another reporting interval, e.g., a reporting interval of eight hours. The storing of the reporting interval of eight hours may be for replacing the reporting interval of two hours in the queue. As such, the reporting interval that is stored (i.e., queued) for sending in the next TAU accept message addressed to the MTC device is the newest reporting interval for the MTC device.

In step 430, the processor determines whether a Tracking Area Update (TAU) request is received from the MTC device. The TAU request is a request to which a TAU accept message may be sent. For example, the MTC device may send a TAU request to the MME periodically. When the TAU request is received, the processor proceeds to step 431. Otherwise, the processor returns to step 420.

In step 431, the processor determines whether there is a reporting interval for the MTC that is to be inserted into a next TAU accept message addressed to the MTC device. When there is a reporting interval to be inserted into the next TAU accept message, the processor proceeds to step 432. Otherwise, the processor proceeds to step 435. For example, there may be a reporting interval in a queue that has not been sent in a previous TAU accept message.

In step 432, the processor inserts the reporting interval for the MTC into the next TAU accept message addressed to the MTC device. For example, the reporting interval may be obtained from the queue and inserted into the TAU accept message. The processor then proceeds to step 435.

In step 435, the processor sends the TAU accept message to the MTC device. The processor then proceeds to step 450. In one embodiment, the TAU accept message that is sent includes the reporting interval inserted into the TAU accept message in step 432. For example, when the reporting interval is identified while there is an active TAU request for which a TAU accept message is not yet sent, the processor may send the reporting interval in the TAU accept message associated with the TAU request that is active. In another example, the TAU accept message may be sent when a TAU request is received from the MTC device after the reporting interval is stored in a queue in accordance with step 427. The MTC device may then begin providing data (i.e., sensed information) in accordance with the newest reporting interval received.

In optional step 450, the processor determines whether data is received from the MTC device. When the data is received from the MTC device, the processor proceeds to step 460. Otherwise, the processor proceeds to steps 420.

In optional step 460, the processor forwards the data that is received from the MTC device to the customer in accordance with a schedule for forwarding of the data to the customer. For example, the processor may store and forward the data via an SCEF. The processor then proceeds either to step 420 or step 499 to end the process.

In one embodiment, the schedule for forwarding of the data to the customer is determined by the customer. In one embodiment, the schedule for forwarding of the data to the customer is distinct from the reporting interval. For example, a customer may request a reporting interval of one hour and a schedule for forwarding of the data of 24 hours. For instance, the MTC device described above may gather data, e.g., sensed water levels, and forward the data that is gathered to the MME in accordance with the reporting interval, e.g., every hour. The MME may forward the data received from the MTC device to the SCEF. The SCEF may then store the data. The SCEF may forward the stored data to the customer in accordance with the schedule for forwarding of the data to the customer, e.g., every 24 hours. Note that the values of the reporting interval and the schedule for forwarding of the data may be the same. That is, even though the reporting interval of the MTC device is distinct from a schedule for forwarding of the data to the customer, the customer and/or the service provider is not precluded from selecting a same length of time for both.

In one embodiment, the schedule for forwarding of the data to the customer may be set to a predetermined value, e.g., a null, when the data is to be forwarded to the customer upon receiving a query. For example, the SCEF may store the data until a query is received from the customer. The data may then be provided to the customer as a response to a query.

In addition, although not specifically specified, one or more steps, functions or operations of method 300 or 400 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 3 or FIG. 4 that recite a determining operation or involve a decision do not necessarily require that both branches of the determining operation be practiced. In other words, one of the branches of the determining operation can be deemed as an optional step. Moreover, steps, blocks, functions or operations of the above described method 300 or method 400 can be combined, separated, and/or performed in a different order from that described above, without departing from the example embodiments of the present disclosure.

As such, the present disclosure provides at least one advancement in the technical field of modification of a reporting interval of an MTC device. For instance, in one example, the present disclosure provides an MME that determines whether a modification of a reporting interval of an MTC device is to be performed, identifies a reporting interval for the MTC device, and sends the reporting interval that is identified to the MTC device. For example, the reporting interval may be sent to the MTC device in a tracking area update accept message. Subsequently, when the MTC device transmits data in accordance with the reporting interval, the data is provided to the customer. The customer may then be able to take an action based on the data received in accordance with the reporting interval.

Figure 5:
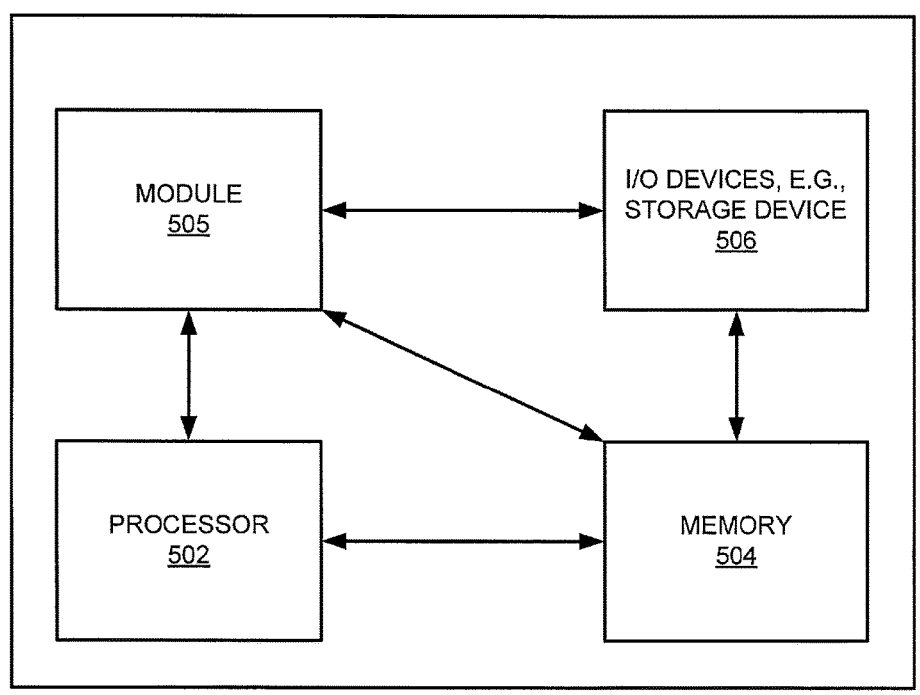
FIG. 5 depicts a high-level block diagram of a computer suitable for use in performing the functions described herein.

FIG. 5 depicts a high-level block diagram of a computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for modification of a reporting interval, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 300 or method 400 as discussed above is implemented in a distributed or parallel manner for a particular illustrative example, i.e., the steps of the above method 300 or method 400, or each of the entire method 300 or method 400 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 505 for modification of a reporting interval (e.g., a software program comprising computer-executable instructions) can be loaded into memory 504 and executed by hardware processor element 502 to implement the steps, functions or operations as discussed above in connection with the illustrative method 300 or method 400.

Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for modification of a reporting interval (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. An apparatus comprising:
    a processor of a communications network of a network service provider; and
    a computer-readable storage device storing a plurality of instructions which, when executed by the processor, cause the processor to perform operations, the operations comprising:
        determining based on a forecast or an occurrence of an event corresponding to a constraint provided by a customer whether a modification of a reporting interval of a machine type communication device is to be performed, wherein the reporting interval is a time interval between sequential reporting of data captured by the machine type communication device, when the machine type communication device is a device of the customer for which the modification of the reporting interval is provided;
        identifying a reporting interval for the machine type communication device when the modification of the reporting interval of the machine type communication device is to be performed; and
        sending the reporting interval that is identified to the machine type communication device in a message.

2. The apparatus of claim 1, wherein the reporting interval that is identified comprises a newest reporting interval.

3. The apparatus of claim 1, wherein the reporting interval that is identified is selected by the customer from a set of reporting intervals that is allowed.

4. The apparatus of claim 3, wherein the set of reporting intervals that is allowed is determined by the network service provider.

5. The apparatus of claim 1, wherein the identifying the reporting interval is based on an agreement between the customer and the network service provider.

6. The apparatus of claim 1, wherein the identifying the reporting interval is based on an assessment of a need of the customer.

7. The apparatus of claim 6, wherein the identifying the reporting interval based on the assessment of the need of the customer is performed by the network service provider.

8. The apparatus of claim 1, wherein the message in which the reporting interval is sent comprises a tracking area update accept message.

9. The apparatus of claim 8, wherein the tracking area update accept message is generated as a response to a tracking area update request that is received prior to the reporting interval being identified.

10. The apparatus of claim 8, wherein the tracking area update accept message is generated as a response to a tracking area update request that is received after the reporting interval is identified.

11. The apparatus of claim 10, the operations further comprising:
    queuing the reporting interval for sending in a next tracking area update accept message addressed to the machine type communication device, when the tracking area update request is received after the reporting interval is identified.

12. The apparatus of claim 1, wherein whether the modification of the reporting interval of the machine type communication device is to be performed is determined based on an assessment of a need of the customer.

13. The apparatus of claim 1, wherein whether the modification of the reporting interval of the machine type communication device is to be performed is determined based on whether a request for modification of the reporting interval of the machine type communication device is received from the customer.

14. The apparatus of claim 13, wherein the request for modification of the reporting interval comprises a new reporting interval.

15. The apparatus of claim 13, wherein the request for modification of the reporting interval is received via an application programming interface.

16. The apparatus of claim 15, wherein the application programming interface is implemented in a service capability exposure function of the network service provider.

17. The apparatus of claim 1, the operations further comprising:
    forwarding data that is received from the machine type communication device to the customer.

18. The apparatus of claim 17, wherein the forwarding the data is performed in accordance with a schedule for forwarding of the data to the customer.

19. A non-transitory computer-readable storage device storing a plurality of instructions which, when executed by a processor of a communications network of a network service provider, cause the processor to perform operations, the operations comprising:
    determining based on a forecast or an occurrence of an event corresponding to a constraint provided by a customer whether a modification of a reporting interval of a machine type communication device is to be performed, wherein the reporting interval is a time interval between sequential reporting of data captured by the machine type communication device, when the machine type communication device is a device of the customer for which the modification of the reporting interval is provided;
    identifying a reporting interval for the machine type communication device when the modification of the reporting interval of the machine type communication device is to be performed; and sending the reporting interval that is identified to the machine type communication device in a message.

20. A method comprising:

determining, by a processor of a communications network of a network service provider, based on a forecast or an occurrence of an event corresponding to a constraint provided by a customer whether a modification of a reporting interval of a machine type communication device is to be performed, wherein the reporting interval is a time interval between sequential reporting of data captured by the machine type communication device, when the machine type communication device is a device of the customer for which the modification of the reporting interval is provided;

identifying, by the processor, a reporting interval for the machine type communication device when the modification of the reporting interval of the machine type communication device is to be performed; and sending, by the processor, the reporting interval that is identified to the machine type communication device in a message.

* * * * *